United States Patent
Gianola et al.

(10) Patent No.: US 8,301,087 B2
(45) Date of Patent: Oct. 30, 2012

(54) METHOD AND SYSTEM FOR RADIATING A RADIOELECTRIC SIGNAL THROUGH A COMBINATION OF SECTOR ANTENNAS

(75) Inventors: Paolo Gianola, Turin (IT); Roberto Vallauri, Turin (IT); Loris Bollea, Turin (IT); Alfredo Ruscitto, Turin (IT)

(73) Assignee: Telecom Italia S.p.A., Milan (IT)

( * ) Notice: Subject to any disclaimer, the term of this patent is extended or adjusted under 35 U.S.C. 154(b) by 274 days.

(21) Appl. No.: 12/681,513

(22) PCT Filed: Oct. 4, 2007

(86) PCT No.: PCT/EP2007/060534
§ 371 (c)(1),
(2), (4) Date: Apr. 2, 2010

(87) PCT Pub. No.: WO2009/043378
PCT Pub. Date: Apr. 9, 2009

(65) Prior Publication Data
US 2010/0227573 A1    Sep. 9, 2010

(51) Int. Cl.
*H03C 7/02*  (2006.01)
*H04B 1/02*  (2006.01)
*H04B 7/02*  (2006.01)

(52) U.S. Cl. .................. 455/101; 455/269; 342/361

(58) Field of Classification Search .......... 455/101–103, 455/226.1–226.3, 269, 272, 277.1, 277.2; 342/361
See application file for complete search history.

(56) References Cited

U.S. PATENT DOCUMENTS

| | | | |
|---|---|---|---|
| 6,178,333 B1 | 1/2001 | Feuerstein et al. | |
| 6,351,237 B1 * | 2/2002 | Martek et al. | 342/361 |
| 6,990,117 B1 * | 1/2006 | Tanaka et al. | 370/447 |

FOREIGN PATENT DOCUMENTS
WO    2006/037364 A1    4/2006

OTHER PUBLICATIONS
International Search Report and Written Opinion dtd Jun. 25, 2008, PCT/EP2007/060534.

* cited by examiner

*Primary Examiner* — Nhan Le
(74) *Attorney, Agent, or Firm* — Banner & Witcoff, Ltd.

(57) ABSTRACT

A method of radiating a radioelectric signal in an area of interest composed of at least two different area sectors, the method including providing at least two sector antennas arranged respective feed signals obtained from said signal; spacing apart the at least two sector antennas from each other of a distance equal to or greater than one wavelength of a radioelectric signal to be irradiated; and acting on the feed signals fed to the at least two sector antennas in such a way that a relative phase of signals transmitted by the at least two sector antennas is caused to vary in time.

18 Claims, 6 Drawing Sheets

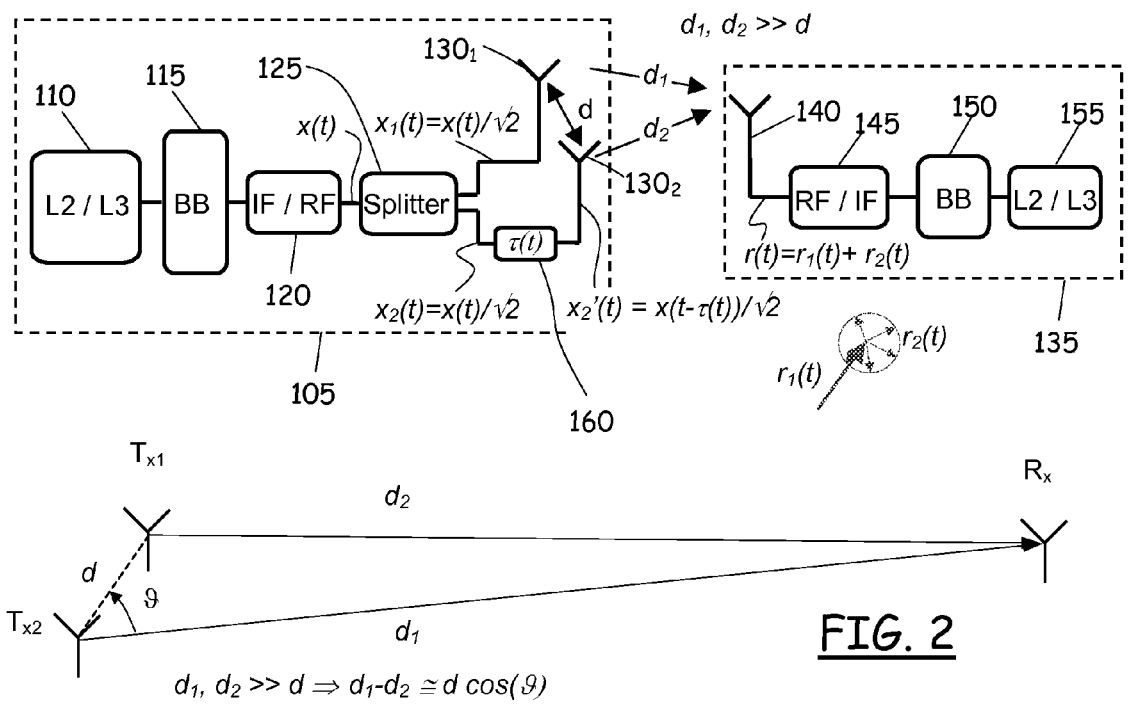
FIG. 1
FIG. 2
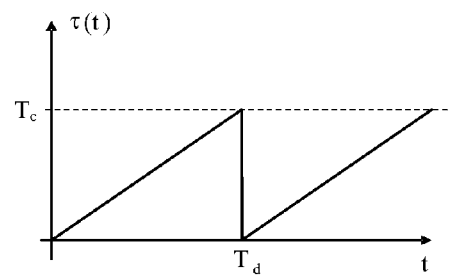
FIG. 3
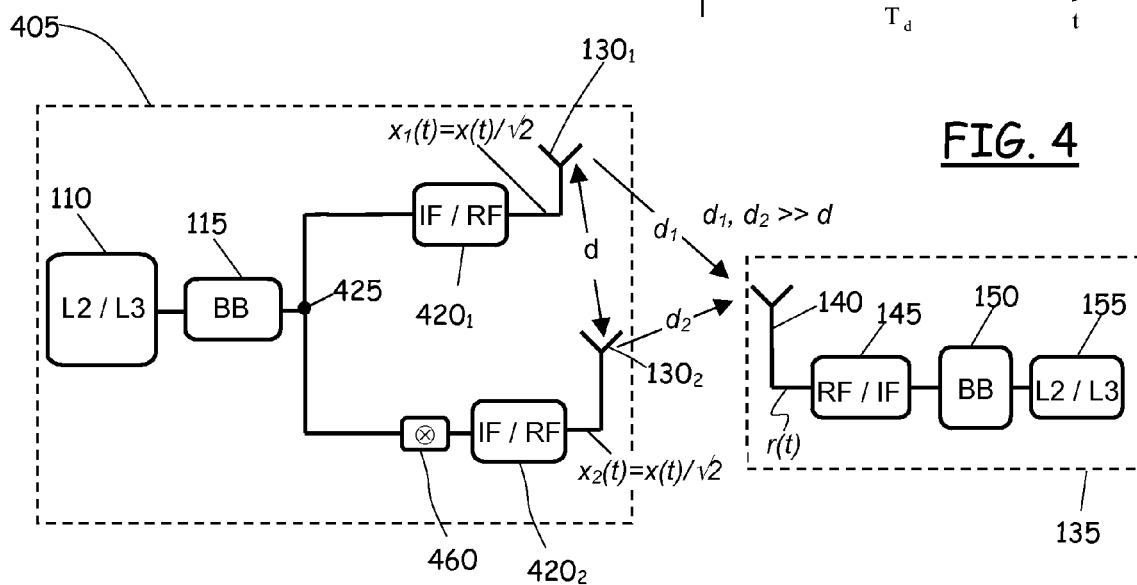
FIG. 4

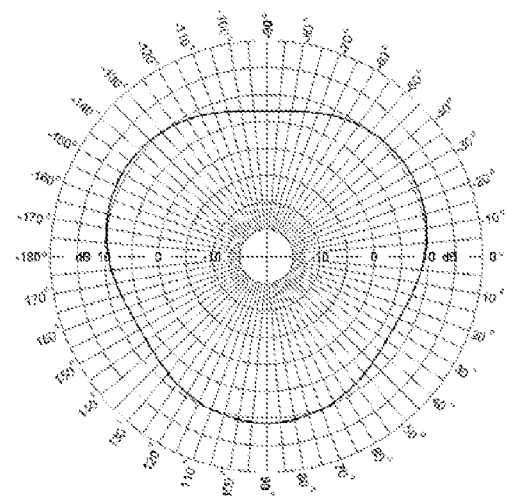 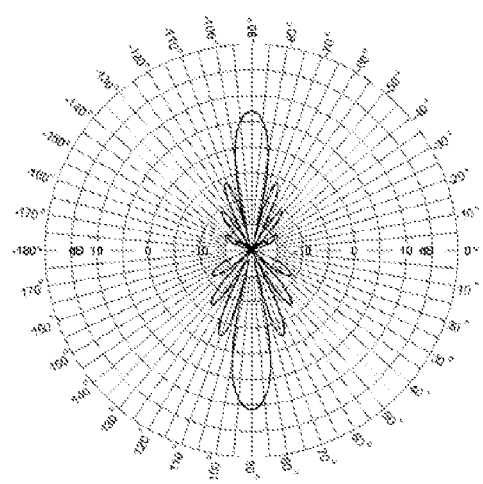
FIG. 11A                    FIG. 11B

METHOD AND SYSTEM FOR RADIATING A RADIOELECTRIC SIGNAL THROUGH A COMBINATION OF SECTOR ANTENNAS

CROSS REFERENCE TO RELATED APPLICATIONS:

This is a U.S. National Phase Application under 35 U.S.C. §371 of International Application No. PCT/EP2007/060534 filed Oct. 4, 2007, which was published Under PCT Article 21(2), the entire contents of which are incorporated herein by reference.

BACKGROUND OF THE INVENTION

1. Field of the Invention

The present invention generally relates to the field of radio telecommunications, particularly, albeit not limitatively, for broadcast transmissions, such as TeleVision (TV), multimedia or, generally, information broadcasting. More specifically, the invention concerns a method and a system for obtaining an essentially omnidirectional radioelectric coverage of an area of interest through a combination of two or more sector antennas.

2. Description of the Related Art

In broadcast radio telecommunications systems, like for example the DVB-T (Digital Video Broadcasting-Terrestrial) system for the diffusion of digitally-coded TV contents, the TV signal is typically broadcast across a geographic area, intended to be covered by the service, exploiting transmitting sites (also known as "transmitters") having transmitting antennas; the transmitters are properly deployed depending on the characteristics (e.g., the morphology, particularly the orography) of the territory of the area of interest.

Regardless of the territory characteristics, the radioelectric coverage of the area of interest should be as uniform as possible; to this purpose, the transmitting sites are typically installed at elevated locations, like for example on the top of hills or mountains, or on high towers. Receiving antennas are, on their side, installed on the roofs of houses or buildings. In this way, the propagation of the signal from the transmitting antennas to the receiving antennas is, with a high likelihood, in "Line Of Sight" ("LOS"); the LOS signal propagation is regarded as the best condition for the signal not to be degraded due to the presence of obstacles on the propagation channel.

Recent digital multimedia contents broadcast systems like the DVB-H (DVB-Handheld) have radioelectric coverage and mobility requirements that make the process of planning of the transmitter network more similar to the planning of a mobile telephony network than to that of a TV broadcast system.

The DVB-H system as a matter of fact provides for the wide-band digital signal to be received by mobile communications terminals (like DVB-H mobile phones) which experience a radio propagation channel strongly affected and degraded by the signal propagation environment, particularly when the user is inside buildings in dense urban areas; in this situation, the signal propagation from the transmitter to the receiver is not in LOS, and is thus defined as "No LOS" ("NLOS").

Additionally, the receivers in DVB-H terminals have performance that are likely to be lower than the performance of the receivers of the mobile phones, particularly under the respects of the sensitivity and the antenna efficiency, due to the required operating bandwidth and the fact that the wavelength of the radio carrier of the DVB-H signal is by far bigger than the practical size of a mobile communications terminal.

The mobility of the terminals further requires that the modulation schemes, the signal encoding and decoding algorithms and the equalization techniques directed to recovering the different signal contributions deriving from multiple signal propagation paths be sufficiently robust, so as to support the service continuity when the mobile terminal moves across the area intended to be covered by the service. Due to this, the requirements on the radioelectric coverage and the signal-to-interference ratio are more stringent compared to digital TV broadcast systems which, like the DVB-T, do not support mobility of the receivers.

A consequence of all this is that the signal broadcast network cannot in general be made up of relatively few transmitter sites, located at relatively elevated positions: the broadcast network needs additional transmitters having lower coverage and deployed across the territory with a density similar to that of the transmitters of a mobile telephony network.

In radio telecommunications systems like mobile telephony networks and radio and/or TV broadcast networks the coverage of the geographic area of interest is typically achieved by means of signal transmitters coupled to omnidirectional and/or sector antennas. Omnidirectional antennas are capable of irradiating the signal substantially uniformly around them, whereas sector antennas are capable of irradiating the signal in angular sectors whose width depends on the electromagnetic features of the antennas.

In radio and TV broadcasting the omnidirectional coverage is often achieved by combining a number of sector antennas fed by the same signal through a properly designed signal distribution network; the reason for this stems from the reflectivity of the trellises sustaining the antennas. Using a combination of sector antennas also gives to the network planner more degrees of freedom in the signal irradiation scheme (for example, it allows shaping the radiation diagrams to take into account the territory morphology). The technique of reconstructing an omnidirectional radiation diagram through the combination of equidistant sector antennas which are equally fed with in-phase signals requires that the antennas are spaced apart of fractions of the wavelength of the irradiated signal. Practically, the sector antennas that are combined to give an omnidirectional coverage are placed in such a way as to form a regular polygon and are spaced apart from one another of fractions (typically, one half) of the signal wavelength. The shape of the radiation diagram will depend on the relative positions of the antennas, on their radiation characteristics and on the phase and amplitude relationships between the signals that feed the different antennas.

The above technique can be adopted in traditional radio and TV broadcasting systems, where the antennas are placed on hills, mountains or trellises, where there are not problems of space and the sector antennas that are combined to emulate an omnidirectional antenna can be placed at the suitable distance from each other.

However, in radio and TV broadcasting systems that have to support mobility of the receivers, like the DVB-H, which require that the signal be broadcast also by transmitters spread across the territory, it would be desirable to use, for the installation of the antennas, sites of an existing mobile telephony network. These sites, conceived for supporting sector antennas, are architecturally not suitable for placing omnidirectional antennas or for placing the sector antennas sufficiently close to each other so as to emulate the radiation diagram of an omnidirectional antenna. For example, in a trellis of a tri-sector site of a mobile telephony network three sector antennas are placed at the vertexes of an equilateral triangle having sides of length equal to some wavelengths of the DVB-H radio-frequency signal that should be transmitted. Thus, the technique exploited in conventional, radio and/or TV broadcasting networks for achieving an omnidirectional radioelectric coverage cannot be relied upon.

There has been some work in the area of transmitting a downlink signal from a base station to one or more mobile terminals with the goal of achieving a desirable radiation diagram that can be in the more general case omnidirectional. For example, U.S. Pat. No. 6,185,440 presents a possible solution through the exploitation, at the base station side, of an array of antenna elements with suitable signal processing operations (weighting) on the signals transmitted by the different elements of the antenna array. In the particular case of U.S. Pat. No. 6,185,440 the generation of the required radiation diagram can be achieved by sequentially repeating the transmission of the downlink signal in such a way that, at each repetition, a different set of weighting coefficients is employed, until when the overlapping of the radiation patterns employed at each repetition generates the required radiation diagram.

SUMMARY OF THE INVENTION

The Applicant observes that in the solution proposed in U.S. Pat. No. 6,185,440, the antennas are spaced apart from one another of a distance less than the wavelength of the transmitted signal (as it should be, since the antenna elements are intended to form an array antenna).

The Applicant has found that, by combining two or more sector antennas, even if spaced apart of a distance higher than one wavelength of the signal to be irradiated, it is possible to achieve (from the receiver's standpoint) a substantially continuous radioelectric coverage of a region of space comprising two or more sectors covered by the two or more sector antennas (either in LOS or NLOS signal propagation conditions). In particular, the Applicant has found that this result can be achieved provided that the sector antennas at the transmitter site are fed with signals that are properly modified, relative to one another, in phase or delay, so that the phase of at least one of the signals received by a terminal in the area of intended coverage varies in time. In particular, the antennas may be fed by signals to which time-variant delays are deliberately applied; suitably designed time delays may be imposed onto the radio-frequency signals that are fed to the antennas, and/or suitably designed time-variant complex coefficient may be used to multiply the base-band signals before transforming them into the radio-frequency signals fed to the different antennas.

For the purpose of the present invention, "substantially continuous radioelectric coverage of a region of space" means that, across such region of space, the radioelectric signal perceived by the receivers may vary in strength, but there are no zones in which the receivers perceive no signal.

In this way, it is possible to obtain a radiation diagram which, from the receiver standpoint, is essentially continuous, possibly equivalent to a radiation diagram of an omnidirectional antenna, even using a combination of sector antennas which are not spaced apart a distance equal to a fraction of the irradiated signal wavelength.

According to an aspect of the present invention, a method of radiating a radioelectric signal through an area of interest composed of at least two different area sectors is provided, the method comprising:
  providing at least two sector antennas arranged to cover the at least two different area sectors;
  feeding the at least two sector antennas with respective feed signals obtained from said signal;
  spacing apart said at least two sector antennas from each other of a distance equal to or greater than one wavelength of a radioelectric signal to be irradiated; and
  acting on the feed signals fed to the at least two sector antennas in such a way that a relative phase of signals transmitted by the at least two sector antennas is caused to vary in time.

Said feed signals may be obtained by splitting in power a radiofrequency signal related to said signal.

Said acting on the feed signals may comprise applying a time-varying delay to at least one of the feed signals respectively fed to the at least two antennas.

Said feeding the at least two sector antennas with respective feed signals obtained from said signal may comprise obtaining, for each of the at least two sector antennas, a respective baseband replica signal of a baseband signal related to said signal.

Said acting on the feed signals may comprise applying a time-varying phase shift to at least one of the baseband replica signal.

Said relative phase of signals transmitted by the at least two sector antennas may vary between 0 and $2\pi$ radians.

Said relative phase may vary according to a periodic function of time. A period of said periodic function of time may be equal to or higher than the inverse of Doppler frequency corresponding to a value of C/N which is 3 dB higher than correspondent value of C/N at half of the maximum Doppler frequency sustained by a "typical" reference DVB-H receiver. In particular, said periodic function of time may be a sawtooth function.

Said at least two sector antennas may in particular include three sector antennas, and said acting on the feed signals may comprise acting on the feed signals fed to at least two sector antennas of the three sector antennas in such a way that a relative phase of the signals transmitted by each pair of the three sector antennas is caused to vary in time.

According to another aspect of the present invention, a radiating system is provided adapted to radiate a radioelectric signal in an area of interest composed of at least two different area sectors, the system comprising:
  at least two sector antennas arranged to cover the at least two different area sectors; and
  an antenna feed structure adapted to feed the at least two sector transmitter antennas with respective signals obtained from said signal,
  wherein
  said at least two sector antennas are spaced apart from each other of a distance (d) equal to or greater than one wavelength of a radioelectric signal to be irradiated; and
  said antenna feed structure is adapted to act on the feed signals fed to the at least two sector antennas in such a way that a relative phase of signals transmitted by the at least two sector antennas is caused to vary in time.

Said antenna feed structure may comprise a power splitter adapted to split in power a radiofrequency signal related to said signal.

Said antenna feed structure may comprise at least one time-varying delay module adapted to apply a time-varying delay to at least one of feed signals fed to the at least two antennas.

Said antenna feed structure may comprise a baseband signal splitter adapted to obtain, for each of the at least two sector antennas, a respective baseband replica signal of a baseband signal related to said signal.

Said antenna feed structure may comprise at least one time-varying phase shifter adapted to apply to at least one of the baseband replica signals a time-varying phase shift.

The relative phase of signals transmitted by the at least two sector antennas may vary between 0 and $2\pi$ radians.

Said relative phase of signals transmitted by the at least two sector antennas may vary according to a periodic function of time. A period of said periodic function of time may be equal to or higher than the inverse of a Doppler frequency corresponding to a value of C/N which is 3 dB higher than correspondent value of C/N at half of the maximum Doppler frequency sustained by a "typical" reference DVB-H receiver. In particular, said periodic function of time may be a sawtooth function.

Said at least two sector antennas may in particular include three sector antennas, and said antenna feed structure may be adapted to act on the feed signals fed to the at least two sector antennas of the three sector antennas in such a way that a relative phase of the signals transmitted by each pair of the three sector antennas is caused to vary in time.

BRIEF DESCRIPTION OF THE DRAWINGS

The features and advantages of the present invention will be made apparent by the following detailed description of some embodiments thereof, provided merely by way of non-limitative examples, description that will be carried out making reference to the attached drawings, wherein:

FIG. 1 schematically shows a structure of a transmitter according to an embodiment of the present invention, and a receiver;

FIG. 2 is a sketch clarifying the geometrical basis for an approximation made in calculations for determining a received signal received by the receiver;

FIG. 3 shows an exemplary shape of a time-varying delay applied to a radio-frequency signal before feeding one sector antenna of the transmitter, according to an embodiment of the present invention;

FIG. 4 schematically shows a structure of a transmitter according to another embodiment of the present invention, and a receiver;

FIGS. 11A and 11B show the radiation diagrams in the horizontal and vertical planes calculated for transmitter antennas calculated for antennas of the second type under the same hypothesis as in FIGS. 10A and 10B;

DETAILED DESCRIPTION OF EMBODIMENTS OF THE INVENTION

Figures 5, 6A, 6B:
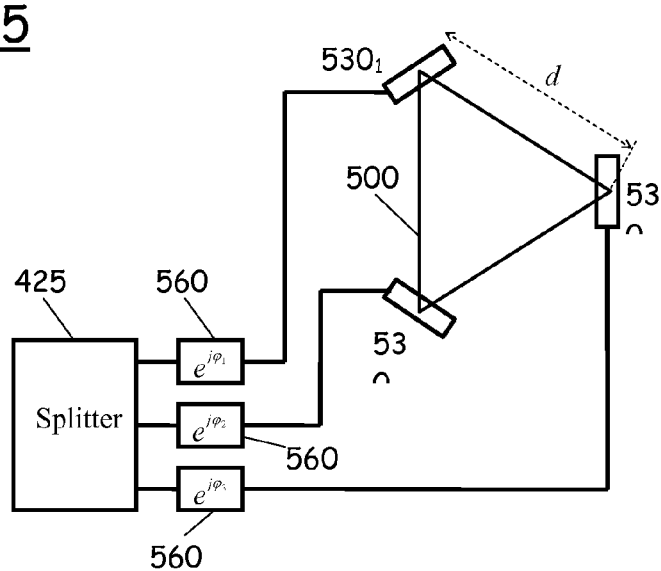
FIG. 5 schematically shows a structure of a transmitter with three sector antennas, according to an embodiment of the present invention.
FIGS. 6A and 6B show radiation diagrams in the horizontal and vertical planes of a first type of transmitter antenna considered in simulations conducted by the Applicant.

Making reference to FIG. 1, there is schematically depicted a two sector transmitter 105 of a broadcast system, like for example a DVB-H system, according to an embodiment of the present invention. The two sector transmitter 105 is intended to provide radioelectric coverage of an area of interest being a region of space comprising two different area sectors.

The transmitter 105 comprises an L2/L3 module 110, intended to represent the OSI (Open System Interconnect) layers 2 and 3, a BaseBand (BB) module 115, generating a BB signal, an Intermediate Frequency (IF) and Radio Frequency (RF) module 120, which is fed with the BB signal and generates a signal x(t), at radio frequency. The RF signal x(t) is then fed to a power splitter module 125, which splits the RF signal power into two (as in the shown example, more generally N, with N being an integer higher than 1) RF signals $x_1(t)=x(t)/\sqrt{2}$ and $x_2(t)=x(t)/\sqrt{2}$; in particular, albeit not limitatively, each of the N RF signals generated by the power splitter 125 has a power equal to 1/N times the power of the RF signal x(t), like in the shown example wherein each of the signals $x_1(t)=x(t)/\sqrt{2}$ and $x_2(t)=x(t)/\sqrt{2}$ has a power which is ½ the power of the signal x(t).

The N (two, in the shown example) signals generated by the power splitter 125 are each one fed to a respective antenna, like the two antennas $130_1$, $130_2$ shown in the example, to be irradiated in an area of interest.

The N (two, in the shown example) antennas $130_1$, $130_2$ are assumed to be sector antennas, and they are positioned spaced apart from each other a distance d; the distance d is equal to or higher than one wavelength of the RF signals which are fed thereto and are to be irradiated; in particular, the distance d may be equal to several signal wavelengths.

The RF signal x(t) may be analytically expressed as a complex function $\overset{\circ}{x}(t)$:

$$\overset{\circ}{x}(t)=s(t)e^{j2\pi f_c t}$$

where $f_c$ is the carrier frequency, i.e. the frequency of the RF signal irradiated, s(t) is the BB signal and $x(t)=\Re(\overset{\circ}{x}(t))$, i.e. the signal x(t) is the real part of the complex function $\overset{\circ}{x}(t)$. It is assumed that the BB signal s(t) is a narrow-band signal, having a bandwidth substantially lower than the carrier frequency $f_c$.

The irradiated signals are received by a receiver 135 which is located in the area of interest. The receiver 135 may for example be a DVB-H receiver, incorporated in a mobile phone (not shown). The signals are received by a receiver antenna 140. The received signal r(t) is the composition of N (two, in the considered example) signals $r_1(t)$ and $r_2(t)$ which correspond to the N irradiated by the N antennas of the transmitter 105. The received signal r(t) is then fed to an RF/IF converter 145 that transforms the RF received signal into an IF signal, which is then fed to a BB converter 150 to obtain a BB signal; the BB signal is then fed to a module 155 implementing the OSI layers 2 and 3.

Under the above-mentioned assumption that the BB signal s(t) is a narrow-band signal, and assuming a LOS signal propagation channel, the received signal is a composition of delayed and attenuated replicas of the signal irradiated by each of the N (two, in the considered example) transmitter antennas, and can be expressed as a complex function $\overset{\circ}{r}(t)$:

$$\overset{\circ}{r}(t) = \qquad \text{eq. 1}$$

$$\overset{\circ}{r}_1(t) + \overset{\circ}{r}_2(t) = \frac{\sqrt{G_{RX}}}{4\pi/\lambda}\left(\frac{\sqrt{G_1}}{d_1}\frac{\overset{\circ}{x}(t-d_1/c)}{\sqrt{2}} + \frac{\sqrt{G_2}}{d_2}\frac{\overset{\circ}{x}(t-d_2/c)}{\sqrt{2}}\right)$$

where $d_1$ and $d_2$ are the distances of the receiver antenna 140 from the transmitter antennas 130$_1$, 130$_2$, respectively; $G_1$ and $G_2$ are the gains of the transmitter antennas 130$_1$, 130$_2$, respectively, in the LOS direction to the receiver antenna 140; $G_{RX}$ is the gain of the receiver antenna 140, c the electromagnetic field propagation speed, and $\lambda=c/f_c$ is the wavelength of the RF signal.

As sketched in FIG. 2, since $d \ll d_1, d_2$, the difference between the distances $d_1$ and $d_2$ is approximately equal to $d \cdot \cos(\theta)$, being $\theta$ the angle formed by the line joining the two transmitter antennas and the line joining one of the two transmitter antennas, e.g. the antenna 130$_2$ and the receiver antenna 140. Thus, it is $|d_2 - d_1| \leq d$. The signal propagation attenuation is essentially the same for the two transmitted signals, and the receiver antenna 140 sees the N (two, in the example considered) transmitter antennas 130$_1$, 130$_2$ in essentially the same direction; thus, a single receiver antenna gain $G_{RX}$ can be considered. The difference in delays experienced by the two transmitted signals, transmitted by the two transmitter antennas, is lower than or equal to d/c, thus it is limited to a few periods of the RF carrier, particularly to $d/\lambda$, periods; thus, the delays difference can be neglected as far as the BB signal is considered (under the assumption that the BB signal is a narrow-band signal) that is:

$$s(t-d_2/c) \approx s(t-d_1/c);$$

on the contrary, the delays difference cannot be neglected as far as the RF carrier is considered: as a consequence, the difference in delay experienced by the RF transmitted signals may cause interference phenomena at the receiver.

Neglecting for the sake of simplicity the propagation delay in the expression of the complex function $\overset{\circ}{x}(t)$, the received signal may be expressed as:

$$\overset{\circ}{r}(t) \cong \overset{\circ}{x}(t)\frac{\sqrt{G_{RX}}}{4\pi d_2/\lambda}\left(\frac{\sqrt{G_2}}{\sqrt{2}} + \frac{\sqrt{G_1}}{\sqrt{2}}e^{-j2\pi\frac{d_1-d_2}{c}f_c}\right) \qquad \text{eq. 2}$$

In eq. 2 above, the term $$\sqrt{G_2/2} + \sqrt{G_1/2}\, e^{-j2\pi\frac{d_1-d_2}{c}f_c}$$

is the radiation diagram at the frequency $f_c$, obtained by feeding the two transmitter antennas with signals of same amplitude and phase. In those angular directions in respect of which the radiation diagrams of the two transmitter antennas superimposes with a same intensity (i.e., $G_1 \approx G_2$) and in phase opposition, the two contributions to the received signal cancel each other, thus the received signal is zero. Destructive interference takes places.

Referring again to FIG. 2, it is:

$$(d_1-d_2)f_c/c = (d_1-d_2)/\lambda \approx (d/\lambda)\cos(\theta),$$

whereby as the distance d between the two transmitter antennas increases, the directions for which $2\pi d \cos(\theta)/\lambda$ is a multiple of $\pi$, and thus the directions for which the two signal contributions cancel each other giving rise to destructive interference, become denser around the angular direction corresponding to $G_1 \approx G_2$.

According to an embodiment of the present invention, in order to avoid destructive interference effects at the receiver caused by the separation d between the two transmitter antennas 130$_1$, 130$_2$ a delay module 160 is associated with at least one of the two transmitter antennas 130$_1$, 130$_2$, for example, as depicted in FIG. 1, with the antenna 130$_2$. In particular, the delay module 160, for example a delay line, is designed to introduce a time-varying delay $\tau(t)$ on the signal $x_2(t)=x(t)/\sqrt{2}$, with respect to the signal $x_1(t)=x(t)/\sqrt{2}$, before feeding it to the antenna 130$_2$, to obtain a delayed signal $x_2'(t)=x(t-\tau(t))/\sqrt{2}$.

With the introduction of the delay module 160, the signal received by the receiver 135 (in the LOS hypothesis) can be expressed as:

$$\overset{\circ}{r}(t) \cong \overset{\circ}{x}(t)\frac{\sqrt{G_{RX}}}{4\pi d_2/\lambda}\left(\frac{\sqrt{G_2}}{\sqrt{2}} + \frac{\sqrt{G_1}}{\sqrt{2}}e^{-j2\pi\left(\frac{d}{\lambda}\cos(\theta)-\tau(t-d_2/c)/T_c\right)}\right) \qquad \text{eq. 3}$$

The time-varying delay $\tau(t)$ may for example be a periodic function, with period $T_d$. For example, the time-varying delay $\tau(t)$ may be a sawtooth function, as depicted in FIG. 3, periodically varying in the range $[0, T_c]$, where $T_c$, is the period of the RF carrier. Other shapes of the time-varying delay function are possible; for example, the sawtooth function of FIG. 3 may be approximated by a step-wise function, or a triangular function may be used.

Thanks to the fact that the delay applied to one of the two signals irradiated by the two transmitter antennas 130$_1$ and 130$_2$ varies in time, in the area of interest no angular position exists for which the received signal is always affected by destructive interference, as proven hereinbelow; it is observed that this result would not be achieved with a constant time delay, because in this case the effect on the received signal would merely be of changing the angular position for which there is destructive interference.

Assuming that, in a period $T_c$, of the RF carrier, the BB signal $\tau(t)$ and the delay $\tau(t)$ are essentially constant, which means that the maximum delay applied to the signal $x_2(t)=x(t)/\sqrt{2}$ is much lower than the period $T_d$ of the time-varying delay $\tau(t)$, the mean power in a period $T_c$, of the received signal is:

$$P_m(t) = \frac{1}{T_c}\int_t^{t+T_c}\Re\left(\overset{\circ}{r}(w)\right)dw \qquad \text{eq. 4}$$

$$\cong \frac{|s(t)|^2}{2}\frac{G_{RX}}{(4\pi d_2/\lambda)^2}$$

$$\left(\frac{G_1+G_2}{2} + \sqrt{G_1 G_2}\cos\left(2\pi\left(\frac{d}{\lambda}\cos(\theta)-\tau(t-d_2/c)/T_c\right)\right)\right)$$

Assuming for simplicity, and without loosing generality, that the power $|s(t)|^2$ of the BB signal s(t) is constant in the period $T_d$ of the sawtooth time-varying delay $\tau(t)$ of FIG. 3, the average value P of the power of the received signal in the period $T_d$ is equal to:

$$P = \frac{1}{T_d}\int_t^{t+T_d} Pm(w)dw \cong \frac{|s(t)|^2}{2}\frac{G_{RX}}{(4\pi d_2/\lambda)^2}\left(\frac{G_1+G_2}{2}\right) \quad \text{eq. 5}$$

Thus, on average, the radiation diagrams of the two sector antennas $130_1$ and $130_2$ add up in power, and, as a consequence, there are no effects of totally destructive interference.

The impact of the described technique on the receiver performance depends on the coding, modulation and frame structure of the transmitted signal; these aspects are also to be taken into account in the choice of both shape and value of the period $T_d$ of the time-varying signal. Simulations and/or experimental tests can be exploited to this purpose.

FIG. 4 schematically shows another embodiment of the invention, in which, similarly to the previously described embodiment, a transmitter site 405 comprises two sector antennas $130_1$, $130_2$, spaced apart from each other of one wavelength of the RF signal to be transmitted, or more.

Differently from the previously described embodiment, the transmitter 405 comprises an independent RF chain for each of the transmitter antennas $130_1$, $130_2$. The signal generated by the OSI layers 2 and 3 (module 110 in the drawing) and the BB module 415 is fed to a digital splitter 425 that creates two (as in the shown example, more generally N, with N being an integer higher than 1) identical replicas of the incoming signal.

The two signals exiting the digital splitter 425 are each one fed to a respective RF chain, including an IF/RF conversion module $420_1$, $420_2$. The signal exiting the IF/RF conversion module $420_1$, $420_2$ is fed to a respective transmitter antenna $130_1$, $130_2$.

According to an embodiment of the present invention, in one of the two RF chains a multiplier 460 is provided, adapted to digitally multiply the respective BB signal by a complex exponential, having for example the expression $e^{j\cdot 2\cdot \pi \cdot \tau(t)/Tc}$, with $\tau(t)$ varying as a function of time. The function $\tau(t)$ may for example take the form of the time-varying delay function of the previously described embodiment. In particular, the function $\tau(t)$ may be a periodic function of time, with period $T_d$, periodically varying in the range of values $[0,T_c]$; for example, the function $\tau(t)$ may be the sawtooth function of FIG. 3: in this way, the phase of the signal exiting the multiplier 460 varies in the range $[0,2\pi]$. The effects on the received signal can be expressed by the same equations presented for the previously described embodiment of the invention.

Although in the foregoing transmitter sites with two sector antennas were considered, this is not to be intended as a limitation to the present invention: in general, the invention applies to transmitter sites having two or more sector antennas, not necessarily identical to each other, placed in such a way to achieve, by means of their sector radiating diagrams, radioelectric coverage of a region of space comprising two or more different area sectors, for example a coverage of 360° or less on of an area on or around a plane, e.g. essentially horizontal. In these cases, the consideration made above for the case of two sector antennas are to be made in respect of any pair of sector antennas of the transmitter site. An equivalent, essentially omnidirectional coverage can be achieved by connecting the antennas to the generator of the signal to be irradiated through a signal partitioner, and interposing a time-varying delay line between the signal partitioner and a number of antennas equal to or greater than the integer part of the ratio (N+1)/2, depending on the position of the antennas and the amplitude of their radiation diagrams. In this way, in those regions of the area of interest covered by two sector antennas, the receiver will perceive a signal resulting from the contributions of the two antennas, at least one of which having a time-varying delay, so that both in LOS and in NLOS conditions the signal contributions, on average, add up constructively.

For example, let the case be considered of a transmitter site with three sector antennas $530_1$, $530_2$ and $530_3$ placed at the vertex of a triangle 500, equilateral or approximately equilateral, with sides d equal to one or more wavelengths of the transmitted signal, for example equal to approximately 5 m, as depicted schematically in FIG. 5. Let it also be assumed, merely by way of example, that the transmitter site has a structure similar to that depicted in FIG. 4, with individual RF chains for the different sector antennas $530_1$, $530_2$ and $530_3$, such that, at the input of the three antennas $530_1$, $530_2$ and $530_3$, a signal of equal amplitude and phase is provided (modules like the IF/RF converters are not shown in FIG. 5 for the sake of simplicity). In each of the RF chains, a multiplier $560_1$, $560_2$ and $560_3$ is provided, adapted to multiply the respective signal for a complex exponential $e^{j\phi_1}$, $e^{j\phi_2}$, $e^{j\phi_3}$ (as described above, the phase shifting of the signals can be indifferently implemented by means of delay lines on the split RF signals, or by means of digital multiplications on the replicas of the BB signal). It is pointed out that the condition of equal amplitude and phase of the signals fed to the sector antennas $530_1$, $530_2$ and $530_3$ is not strictly necessary, and is only adopted for simplifying the discussion to be made in the following; in some cases, an uneven distribution of the signal levels (in terms of amplitude and/or phase) may be convenient for properly shaping the radiation diagram of the antennas.

The Applicant conducted simulations for the scenario depicted in FIG. 5. In particular, two theoretical models of antenna were considered, corresponding to different aperture values of the lobe in the horizontal plane:

Antenna Model A:

a model antenna having the radiation diagram depicted in FIG. 6A (in the Horizontal or H plane) and 6B (in the Vertical or V plane) was considered, having the following characteristics:

antenna gain: 16 dBi half-power angle (−3 dB) plane H: ±32° half-power angle (−3 dB) plane V: ±6°

Figure 7A:
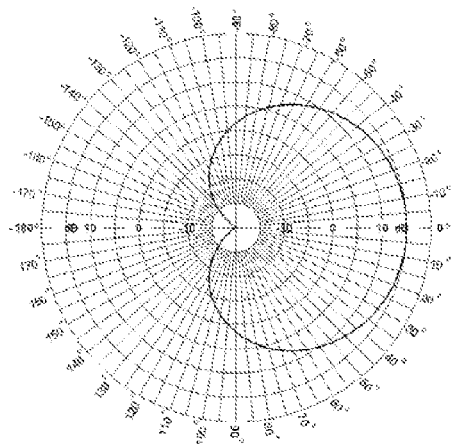
FIGS. 7A and 7B show radiation diagrams in the horizontal and vertical planes of a second type of transmitter antenna considered in simulations conducted by the Applicant.
Figure 7B:
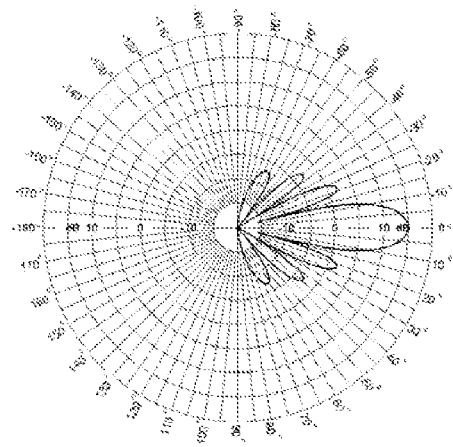

Antenna Model B:

a model antenna having the radiation diagram depicted in FIG. 7A (in the H plane) and 7B (in the V plane) was considered, having the following characteristics:

antenna gain: 14 dBi half-power angle (−3 dB) plane H (Horizontal): ±45° half-power angle (−3 dB) plane V (Vertical): ±6°

The composition of the radiation diagrams of a tri-sector transmitter site like the one shown in FIG. 5 has been calculated at the frequency of 600 MHz, corresponding to an RF wavelength $\lambda=0.5$ m, and to a ratio $d/\lambda=10$. For both the antenna models described above, the analysis has been conducted considering two hypothesis: antennas fed with signals uniform in amplitude and in phase ($\phi_1=\phi_2=\phi_3$), and antennas fed with signal uniform in amplitude but phase varying in time as reported in the following table:

|  | φ₁ | φ₂ | φ₃ |
|---|---|---|---|
| Step 1 | 0 | 0 | 0 |
| Step 2 | 0 | 0 | 90 |
| Step 3 | 0 | 0 | 180 |
| Step 4 | 0 | 0 | 270 |
| Step 5 | 0 | 90 | 0 |
| Step 6 | 0 | 90 | 90 |
| Step 7 | 0 | 90 | 180 |
| Step 8 | 0 | 90 | 270 |
| Step 9 | 0 | 180 | 0 |
| Step 10 | 0 | 180 | 90 |
| Step 11 | 0 | 180 | 180 |
| Step 12 | 0 | 180 | 270 |
| Step 13 | 0 | 270 | 0 |
| Step 14 | 0 | 270 | 90 |
| Step 15 | 0 | 270 | 180 |
| Step 16 | 0 | 270 | 270 |

Figure 8A:
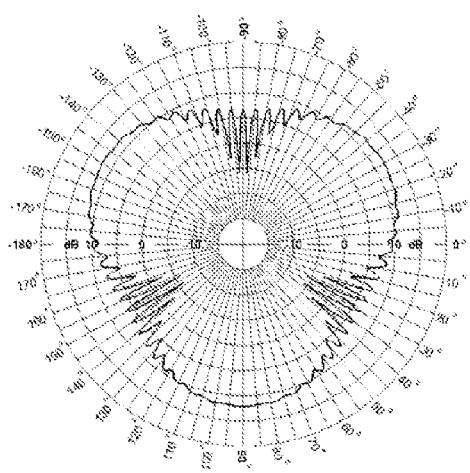
FIGS. 8A and 8B show radiation diagrams in the horizontal and vertical planes calculated in the hypothesis that transmitter antennas of the first type are fed with signals uniform in phase.
Figure 8B:
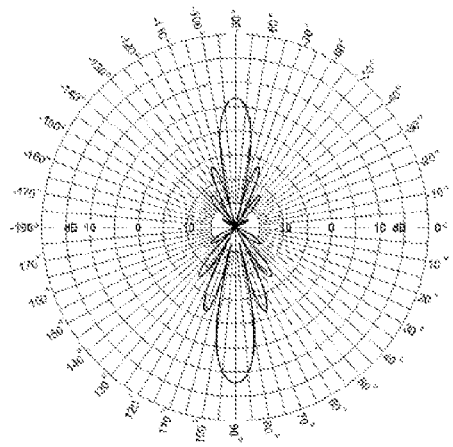
Figure 9A:
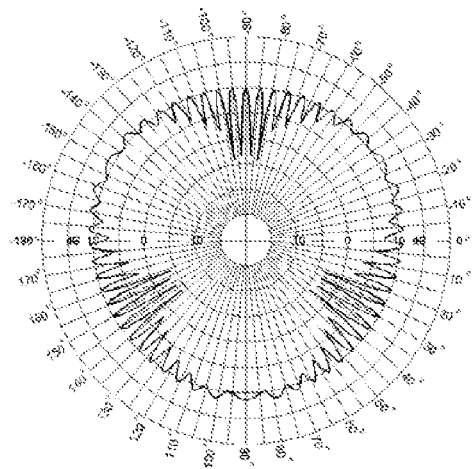
FIGS. 9A and 9B show radiation diagrams in the horizontal and vertical planes calculated in the hypothesis that transmitter antennas of the second type are fed with signals uniform in phase.
Figure 9B:
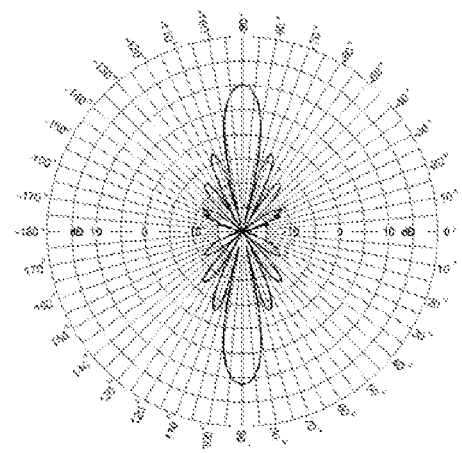

The calculated radiation diagrams in the H and V planes for the hypothesis of signals uniform in phase are depicted in FIGS. 8A and 8B, for antennas of type A, and in FIGS. 9A and 9B, for antennas of type B. From the reported diagrams it can be appreciated that, as a consequence of the relatively high separation of the antennas (in relation to the RF signal wavelength), the radiation diagrams exhibit a relatively high number of lobes with deep notches. Thus, according to eq. 2 above, the resultant coverage of the area of interest by the tri-sector transmitter site would be highly non-uniform.

Figure 10A:
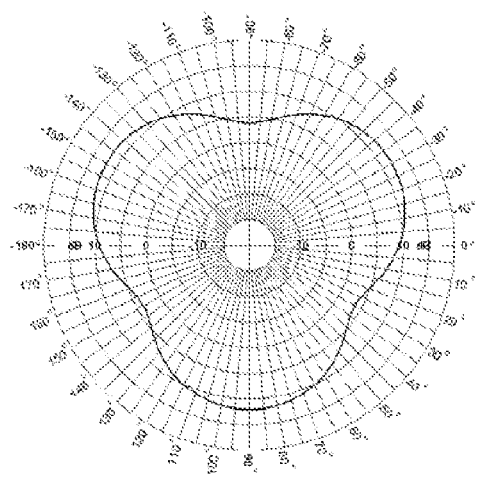
FIGS. 10A and 10B show an average of the radiation diagrams in the horizontal and vertical planes calculated for transmitter antennas of the first type under the hypothesis of feeding the antennas with signals whose phase relations are time varying.
Figure 10B:
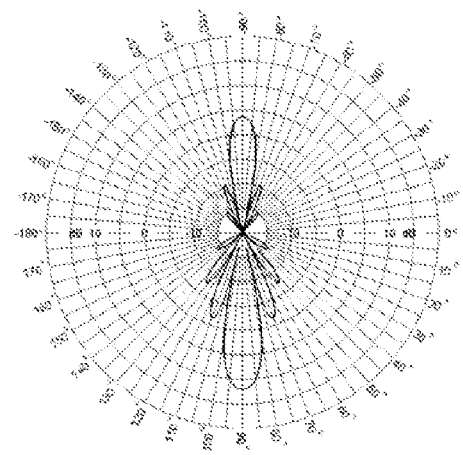

By comparison, FIGS. 10A and 10B report the power average of the radiation diagrams (in the H and V planes, respectively) calculated for antennas of type A under the hypothesis of feeding the antennas with signals whose phase relations are expressed in the table above; similarly, FIGS. 11A and 11B report the radiation diagrams (in the H and V planes, respectively) calculated for antennas of type B under the same hypothesis. The calculation of the power average for the case of three antennas is equivalent to the calculation expressed, in eq. (5) above, for the case of two sector antennas. Looking at FIGS. 10A and 10b, it can be observed that the equivalent radiation diagram in the H plane, resulting from the average in power of 16 different radiation diagrams calculated for the sixteen different phase relations listed in the above table, exhibits a maximum gain of 12 dBi for a corresponding antennas' pointing, and a minimum of 4 dBi for ±60° with respect to the maximum. Looking at FIGS. 11A and 11B, it can be observed that the equivalent radiation diagram in the H plane resulting from the average in power of 16 different radiation diagrams calculated for the sixteen different phase relations listed in the above table, exhibits a maximum gain of 10.5 dBi for a corresponding antennas' pointing, and a minimum of 7 dBi for ±60° with respect to the maximum. Thus, thanks to the wider lobe on the H plane, the equivalent radiation diagram resulting from the combination of three type B sector antennas exhibits an enhanced continuity in the H plane compared to the equivalent radiation diagram obtained combining three type A sector antennas.

Referring back to FIG. 1, let the case of an NLOS propagation of the signal be considered. The signal received by the receiver can be expressed as:

$$r(t) = x_1(t)c_1(t) + x_2(t)c_2(t)$$

where $c_1(t)$ and $c_2(t)$ represents the complex channel coefficients for the antennas $130_1$ and $130_2$, respectively taking into account the attenuation and phase shifts introduced during the propagation over the radio channel.

Figure 12A:
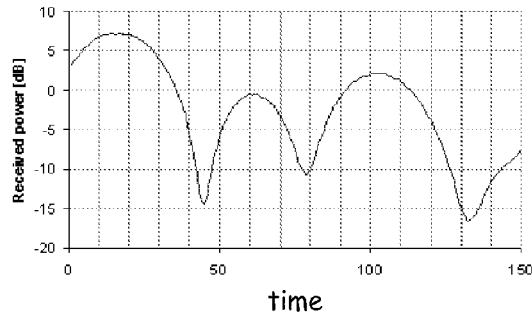
FIGS. 12A and 12B are diagrams (received power in dB in ordinate against time in abscissa) depicting the results of simulations conducted for a WCDMA (Wideband Code Division Multiple Access) system, respectively without applying a time-varying delay to the signal fed to one of the two transmitter antennas and applying the time-varying delay having the shape of a sawtooth function as depicted in FIG. 3.
Figure 12B:
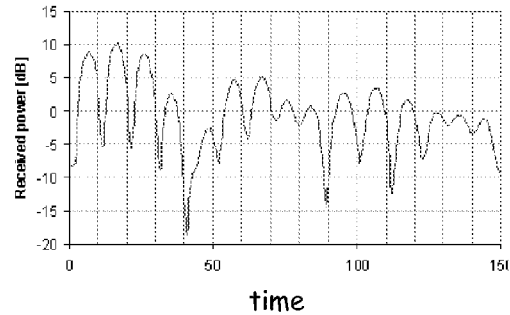

Using numerical simulation techniques, it is possible to see that the envelope of the received signal r(t) is affected by fading variations much faster than those affecting the signal that would be received in case a single transmitter antenna were used. FIGS. 12A and 12B depict the results of the simulations conducted for a WCDMA (Wideband Code Division Multiple Access) system, respectively without the provision of the delay module 160 and with the application of a time-varying delay to the signal fed to one of the two transmitter antennas, particularly a time-varying delay having the shape of a sawtooth function as depicted in FIG. 3. By comparing the diagrams reported in these figures, it can be seen that the application of a time-varying delay to the signals fed to one of the two transmitter antennas, although not completely eliminating the deep fades in the received signal which occur when the components of the received signal have similar amplitude and opposing phase, reduces the duration of the deep fades, and this translates into an improvement in the receiver performance.

As far as the choice of the period $T_d$ with which the time-variable delay varies in the range [0,Tc] is concerned, theoretical analysis, radio link simulations or measurements can prove that good results are achieved when the period with which a 360° change in phase of the RF signal takes place is of the order of the duration of the interleaving depth of the considered system. In particular, the interleaving depth can be viewed as the period of time during which the transmitted BB signal is interleaved, after the channel encoding operations, for avoiding the presence of subsequent errors on the correspondent baseband received signal.

In the exemplary case of the DVB-H system, the transmitted signal is structured in frames, each one made up of 68 OFDM (Orthogonal Frequency-Division Multiplexing) symbols. In 8K OFDM mode, which is the system using 6785 carriers adopted in DVB, each symbol lasts 1120 μs, so that the radio frame, during which interleaving is applied, has a duration equal to 68×1120 μs=76.16 ms. The period $T_d$ of the time-variable delay should thus be of this order.

Figure 13:
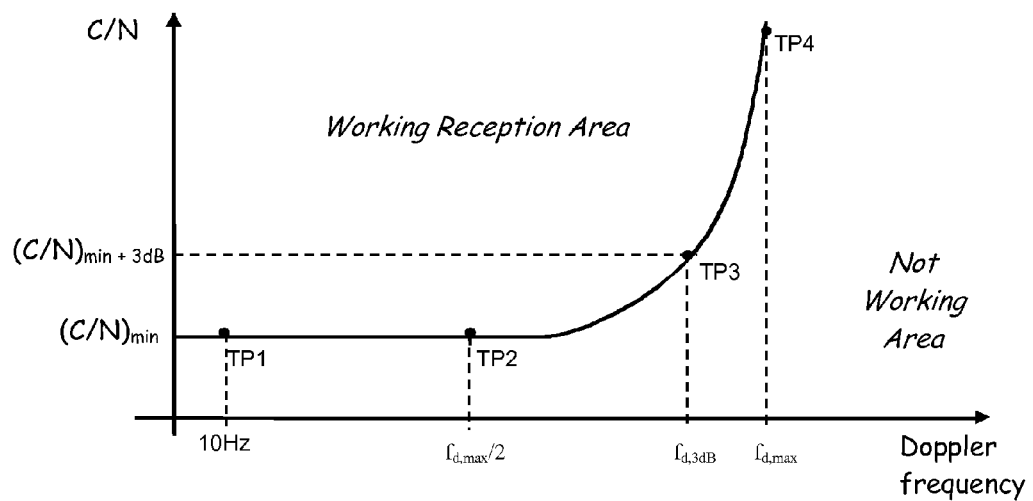
FIG. 13 is a diagram shown the C/N (in ordinate) versus Doppler frequency (in abscissa) behaviour of a receiver.

Mobile DVB-H receivers are as known equipped with channel equalizers capable of recovering, within prescribed limits, the distortions caused by Doppler effect ("Doppler spread"). As diagrammatically shown in FIG. 13, for Doppler frequency values below the maximum Doppler frequency sustained by the receiver, the latter (similarly to mobile phone receivers operating with 2-G, 2.5-G and 3-G mobile telephony networks) is capable of performing a channel equalization such that the performances are essentially independent of the Doppler frequency experienced by the received signal. When the maximum Doppler frequency is exceeded, the performance falls down to a level at which no demodulation of the received signal is possible.

Thus, given an OFDM mode and a signal propagation scenario, when the Doppler frequency value is below a threshold value given by $f_{d,max}/2$, the minimum C/N that guarantees a certain quality of the demodulated signal is independent from the Doppler frequency. This feature of the DVB-H receiver makes the receiver performance essentially independent from the speed of movement of the receiver up to the point the receiver motion is such as to produce a Doppler effect with $f<f_{d,max}/2$.

In addition to the $f_{d,max}$ parameter, the DVB-H standard defines with the notation $f_{d,3dB}$ the particular value of the Doppler frequency corresponding to a value of C/N which is 3 dB higher than the value at $f_{d,max}/2$, for guaranteeing the same quality of the demodulated signal. The value of $f_{d,3dB}$ depends on the parameters of the employed DVB-H transmission mode, such as modulation, code rate and carrier frequency. Possible values of the parameter $f_{d,3dB}$ for a "typical" reference receiver are disclosed in document "Draft TR 102

377 V1.2.2 (2006-03)", pages 81-82 (section 10.3.2.5: C/N performance in Mobile Channels).

In the exemplary invention embodiment providing for applying to the RF signal fed to the transmitter antenna a sawtooth time-varying delay varying in the range [0, $T_c$] with period $T_d$, from eq. (3) above it can be noted that a variation $$f_d = \frac{1}{T_d}$$

of the carrier frequency is introduced on the transmitted signal.

In the channel propagation models for mobile applications, the Doppler frequency is expressed in terms of equivalent speed $V_{eq}$, obtained from the relations:

$$f_d = V_{eq}/\lambda = (V_{eq}/c)f_c$$

from which the Doppler equivalent speed $V_{eq}$ of the signal transmitted by the antenna fed with the delayed signal can be obtained:

$$V_{eq} = c\frac{T_c}{T_d}$$

The requirement that the Doppler frequency $f_D$, be lower than the parameter $f_{d,3dB}$ sets a lower limit for the period $T_d$ of the time-varying delaying function applied to the signal to be transmitted.

For example, for fc=650 MHz (corresponding to a period Tc=1538 ps), the table below lists the values of the equivalent speed and the corresponding values of Td and fd.

| $V_{eq}$ [km/h] | $f_d$ [Hz] | $T_d$ [ms] |
|---|---|---|
| 5 | 3.0 | 332.3 |
| 10 | 6.0 | 166.1 |
| 20 | 12.0 | 83.1 |
| 30 | 18.1 | 55.4 |
| 40 | 24.1 | 41.5 |
| 50 | 30.1 | 33.2 |
| 70 | 42.1 | 23.7 |

It has been assessed that, in case of NLOS propagation, the maximum gain obtainable by applying a time-varying delay to the radio frequency signal to be transmitted, compared to the case where the time-varying delay is not applied, increases in terms of reduction of the C/N at the "picture failure point" (defined as the particular value of C/N in correspondence of which the quality of the received picture cannot be correctly perceived) with the increase in the equivalent speed induced by the time-varying delay application, up to a maximum of 3 dB with equivalent speed between 30 and 40 Km/h.

For higher induced speeds, the gain tends to reduce due to the effects of the speed on the signal processing algorithms implemented at the receiver. The induced mobility of 30 Km/h corresponds to a complete phase rotation in 55.4 ms (for a center frequency of 650 MHz, corresponding to the DVB-H channel 43). Longer periods, corresponding to lower equivalent speed, are such that in one radio frame there is not a complete phase rotation, thus the benefits of the described technique is reduced.

The present invention has been here described making reference to some exemplary and non limitative embodiments thereof. However, those skilled in the art will recognize that several modifications to the described embodiments, as well as alternative embodiments of the invention are possible, without departing from the scope of the invention as defined in the appended claims.

The invention claimed is:

1. A method of radiating a radioelectric signal in an area of interest composed of at least two different area sectors, the method comprising:
   providing at least two sector antennas arranged to cover the at least two different area sectors;
   feeding the at least two sector antennas with respective feed signals obtained from a signal,
   spacing apart said at least two sector antennas from each other a distance equal to or greater than one wavelength of a radioelectric signal to be irradiated; and
   acting on the feed signals fed to the at least two sector antennas in such a way that a relative phase of signals transmitted by the at least two sector antennas is caused to vary in time,
   wherein said at least two sector antennas include three sector antennas, and
   wherein said acting on the feed signals comprises acting on the feed signals fed to at least two sector antennas of the three sector antennas in such a way that a relative phase of the signals transmitted by each pair of the three sector antennas is caused to vary in time.

2. The method of claim 1, wherein said feed signals are obtained by splitting in power a radiofrequency signal related to said signal.

3. The method of claim 2, wherein said acting on the feed signals comprises applying a time-varying delay to at least one of the feed signals respectively fed to the at least two sector antennas.

4. The method of claim 1, wherein said feeding the at least two sector antennas with respective feed signals obtained from said signal comprises obtaining, for each of the at least two sector antennas, a respective baseband replica signal of a baseband signal related to said signal.

5. The method of claim 4, wherein said acting on the feed signals comprises applying a time-varying phase shift to at least one of the baseband replica signal.

6. The method of claim 1, wherein said relative phase of signals transmitted by the at least two sector antennas varies between 0 and $2\pi$ radians.

7. The method of claim 1, wherein said relative phase varies according to a periodic function of time.

8. The method of claim 7, wherein said periodic function of time is a sawtooth function.

9. A method radiating a radioelectric signal in an area of interest composed of at least two different area sectors, the method comprising:
   providing at least two sector antennas arranged to cover the at least two different area sectors;
   feeding the at least two sector antennas with respective feed signals obtained from a signal,
   spacing apart said at least two sector antennas from each other a distance equal to or greater than one wavelength of a radioelectric signal to be irradiated; and
   acting on the feed signals fed to the at least two sector antennas in such a way that a relative phase of signals transmitted by the at least two sector antennas is caused to vary in time,
   wherein said relative phase varies according to a periodic function of time, and
   wherein a period of said periodic function of time is equal to or higher than the inverse of a Doppler frequency corresponding to a value of C/N which is 3 dB higher than the correspondent value of C/N at half of the maximum Doppler frequency sustained by a "typical" reference DVB-H receiver.

10. A radiating system adapted to radiate a radioelectric signal in an area of interest composed of at least two different area sectors, the system comprising:
- at least two sector antennas arranged to cover the at least two different area sectors; and
- an antenna feed structure adapted to feed the at least two sector antennas with respective signals obtained from a signal, wherein said at least two sector antennas are spaced apart from each other a distance (d) equal to or greater than one wavelength of a radioelectric signal to be irradiated;

said antenna feed structure is adapted to act on the feed signals fed to the at least two sector antennas in such a way that a relative phase of signals transmitted by the at least two sector antennas is caused to vary in time;

said at least two sector antennas include three sector antennas; and said antenna feed structure is adapted to act on the feed signals fed to the at least two sector antennas of the three sector antennas in such a way that a relative phase of the signals transmitted by each pair of the three sector antennas is caused to vary in time.

11. The radiating system of claim 10, wherein said antenna feed structure comprises a power splitter adapted to split in power a radiofrequency signal related to said signal.

12. The radiating system of claim 11, wherein said antenna feed structure comprises at least one time-varying delay module adapted to apply a time-varying delay to at least one of feed signals fed to the at least two sector antennas.

13. The radiating system of claim 10, wherein said antenna feed structure comprises a baseband signal splitter adapted to obtain, for each of the at least two sector antennas, a respective baseband replica signal of a baseband signal related to said signal.

14. The radiating system of claim 13, wherein said antenna feed structure comprises at least one time-varying phase shifter adapted to apply to at least one of the baseband replica signals a time-varying phase shift.

15. The radiating system of claim 10, wherein the relative phase of signals transmitted by the at least two sector antennas varies between 0 and $2\pi$ radians.

16. The radiating system of claim 10, wherein said relative phase of signals transmitted by the at least two sector antennas varies according to a periodic function of time.

17. The radiating system of claim 16, wherein a period of said periodic function of time is equal to or higher than the inverse of a Doppler frequency corresponding to a value of C/N which is 3 dB higher than correspondent value of C/N at half of the maximum Doppler frequency sustained by a "typical" reference DVB-H receiver.

18. The radiating system of claim 16, wherein said periodic function of time is a sawtooth function.

* * * * *